(12) United States Patent
Jensen (10) Patent No.: US 11,178,243 B2
(45) Date of Patent: Nov. 16, 2021

(54) SUBSCRIBE-PUBLISH NETWORK DEVICE MONITORING AND MAINTENANCE VIA A SERVICE BUS

(71) Applicant: Toshiba TEC Kabushiki Kaisha, Shinagawa-ku (JP)

(72) Inventor: Gareth M. Jensen, Lake Forest, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 64 days.

(21) Appl. No.: 16/549,452

(22) Filed: Aug. 23, 2019

(65) Prior Publication Data

US 2021/0058476 A1 Feb. 25, 2021

(51) Int. Cl.
*G06F 15/177* (2006.01)
*H04L 29/08* (2006.01)
*G06F 8/60* (2018.01)

(52) U.S. Cl.
CPC ............... *H04L 67/26* (2013.01); *G06F 8/60* (2013.01); *H04L 67/22* (2013.01); *H04L 67/34* (2013.01)

(58) Field of Classification Search
CPC ......... H04L 67/26; H04L 67/22; H04L 67/34; G06F 8/60

USPC .......................................................... 709/220
See application file for complete search history.

(56) References Cited

U.S. PATENT DOCUMENTS

| | | | | |
|---|---|---|---|---|
| 2011/0051165 A1* | 3/2011 | Yamada | ............ | H04N 1/00244 358/1.13 |
| 2014/0286354 A1* | 9/2014 | Van De Poel | ...... | H04L 41/0273 370/463 |
| 2017/0108844 A1* | 4/2017 | Drouot | ............... | G05B 19/4185 |
| 2019/0082058 A1* | 3/2019 | Aoki | .................. | H04N 1/32406 |

* cited by examiner

*Primary Examiner* — Taylor A Elfervig
(74) *Attorney, Agent, or Firm* — Ulmer & Berne LLP (57) ABSTRACT

A system and method for monitoring and maintenance of networked multifunction peripherals includes a service cloud having a cloud server and cloud edge service including one or more cloud edge servers functioning as a service bus. The service bus subscribes to device state information from the multifunction peripherals and obtains and stores the device state information. Device state information is analyzed and used in conjunction with the cloud server to obtain a software package from the server to the service bus. The service bus subscribes to a software installation messaging system with the multifunction peripherals and delivers the software package to them for installation in conjunction with subscription.

19 Claims, 6 Drawing Sheets

SUBSCRIBE-PUBLISH NETWORK DEVICE MONITORING AND MAINTENANCE VIA A SERVICE BUS

TECHNICAL FIELD

This application relates generally to network monitoring and maintenance of multifunction peripherals. The application relates more particularly to use of a service bus that subscribes to multifunction peripherals for receipt of device state data, analysis of device state data and delivery of software packages from a cloud server to the multifunction peripherals in accordance with state data analysis.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs may be maintained remotely via a network connection. It is difficult and time consuming to remotely login to each device when many MFPs are to be maintained.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFP management devices such as Toshiba e-Studio CloudConnect MFPs can connect with a device cloud application program interface (API), such as Toshiba's e-Bridge CloudConnect, for sending alerts in real-time and for sending service files such as counters, setting codes, adjustment codes, clone data, logs, etc., at a selected interval, such as once per day. Devices are suitably set with times to communicate for sending data and receiving updates, such as software updates which may comprise applications, settings, firmware or any other suitable code.

If a communication period is missed due to conditions such an MFP being in power saving mode, a power outage, or network service interruption, an error or condition that occurred during uploads, or when service is down, data for the associated interval can be lost and not recoverable. Additionally, with missed data any device analysis would be less reliable and less precise. Missed data may require a device to make general assumptions about lost data and can lead to more inaccuracies. Updates from service managers may be delayed as they await information on configuration changes to be pulled from devices. If a cloud service accepts more frequent device communications, the resulting increased network load could trigger a denial of service during peak hours.

Example embodiments herein provide for reliable data aggregation from MFP cloud services such as Toshiba e-Studio CloudConnect, unique to supported features and requirements owned by Toshiba America Business Solutions and e-Bridge CloudConnect. Example embodiments herein include three primary components: a cloud client, a cloud service, and a cloud edge.

Rather than relying on traditional data dumping via a client-server method of communication, devices will establish persistent publish-subscribe communications, such as HTTP/2.0, with a multi-tenant messaging service bus for deltas in real-time device sensors and device states. By tracking sensor and setting deltas as a file system, deltas can be buffered and persist on harsh power cycles or missed communication cycles, giving the overall cloud product a much higher level of reliability. Example embodiments herein deliver real-time data aggregation and maintenance with better reliably and robustness.

Under the new method of reliable data aggregation, the device connects to the e-Bridge CloudConnect cloud service using a publish-subscribe communication model. As an example of how this could be accomplished, a message service bus could be employed to directly accept messages from the cloud client in a FIFO queue. To support a publish-subscribe communication model, the device cloud client will instead buffer all delta changes from sensors and settings as a file system. This allows for data to persist between power cycles and missed communications. Sending deltas rather than averages or a single point-value at time of communication allows load to be distributed throughout hours of use. This also allows services to stream real-time analytics to machine learning prediction engines. See diagram for communication pattern between the MFP and cloud service bus.

From the e-Bridge CloudConnect service cloud portal, service managers will be able to push configuration updates and firmware upgrades in real-time or on a schedule with minimal cloud service performance impact. The cloud client's support of the publish-subscribe communication model in combination with service cloud bus allows for more fine-tuned service features for e-Studio CloudConnect devices. Publish-subscribe is a messaging pattern where senders of messages, called publishers, do not program the messages to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are.

Publish-subscribe is related to a message queue paradigm, and is typically one part of a larger message-oriented middleware system. Messaging system may support both the publish-subscribe and message queue models in their API, such as Java Message Service (JMS). Such a pattern provides greater network scalability and a more dynamic network topology, with a resulting decreased flexibility to modify the publisher and the structure of the published data.

Example embodiments herein provide a combination of device and networking capabilities through this new method gives MFP management devices such as Toshiba e-Studio CloudConnect MFPs more cloud reliability and real-time functionality.

Figure 1:
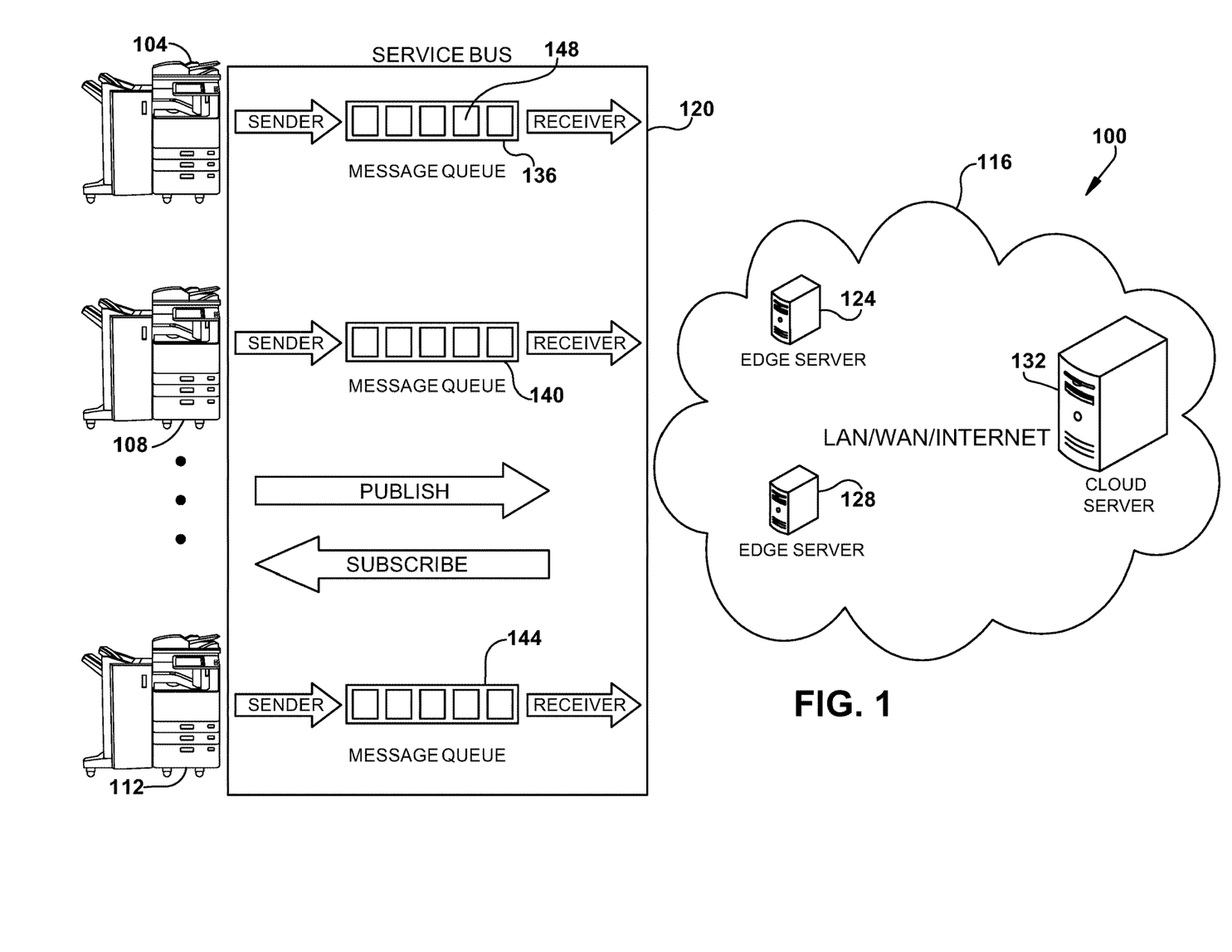
FIG. 1 is an example embodiment of a publish-subscribe cloud device maintenance system.

In accordance with the subject application, FIG. 1 illustrates an example embodiment of a cloud device maintenance system 100 that includes one or more MFPs, illustrated by way of example by MFP 104, 108 and 112. Each MFP is in network communication with network service cloud 116 via service bus 120. Service cloud 116 is suitably comprised of any wireless or wired local area network (LAN) or a wide area network (WAN) which can comprise the Internet, or any suitable combination thereof. Service cloud 116 includes one or more digital devices including, for example edge servers 124 and 128 and cloud server 132. Cloud edge servers are advantageously employed since a massive amount of data may be generated by devices which strain network bandwidth. Devices at a cloud edge leverage physical proximity to monitored MFPs. Computing is moved the away from a cloud server 132 itself and to edge servers 124, 128 acting as network gateways to perform tasks and provide services on behalf of the cloud. By moving services at the edge, it is possible to provide content caching, service delivery, storage and management, resulting in better response times and transfer rates.

In the example embodiment of FIG. 1, service bus 120 is provided on edge servers 124 and 128, and serves as a communication intermediary between the MFPs and service cloud 116. Service bus 120 operates with a publish-subscribe relationship with the MFPs. MFPs 104, 108 and 112 have corresponding message queues 136, 140 and 144. MFP device state information is passed from each MFP to its associated queue as a series of subscribed messages, such as message 140. Service bus 120 is provided with regularly updated device state information from each MFP. Service bus 120 suitably performs analytics, such as machine learning on MFP state data received over time and communicates results with cloud server 132. A persistent data communication path exists between service bus 120 and cloud server 132.

Figure 2:
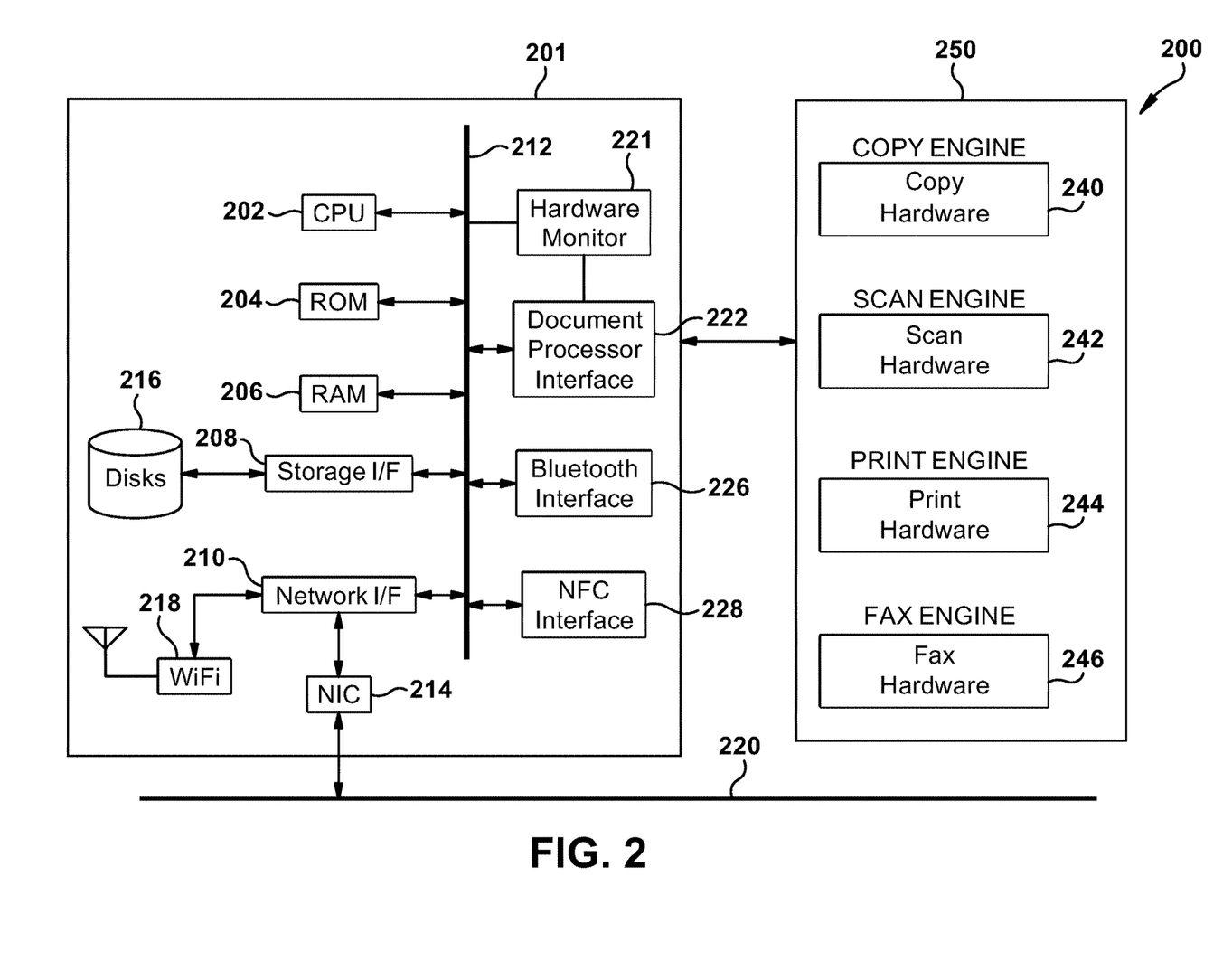
FIG. 2 is an example embodiment of a networked digital device comprising a document rendering system.

Turning now to FIG. 2 illustrated is an example embodiment of a networked digital device comprised of document rendering system 200 suitably comprised within an MFP, such as with MFPs 104, 108, and 112 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, integrated sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
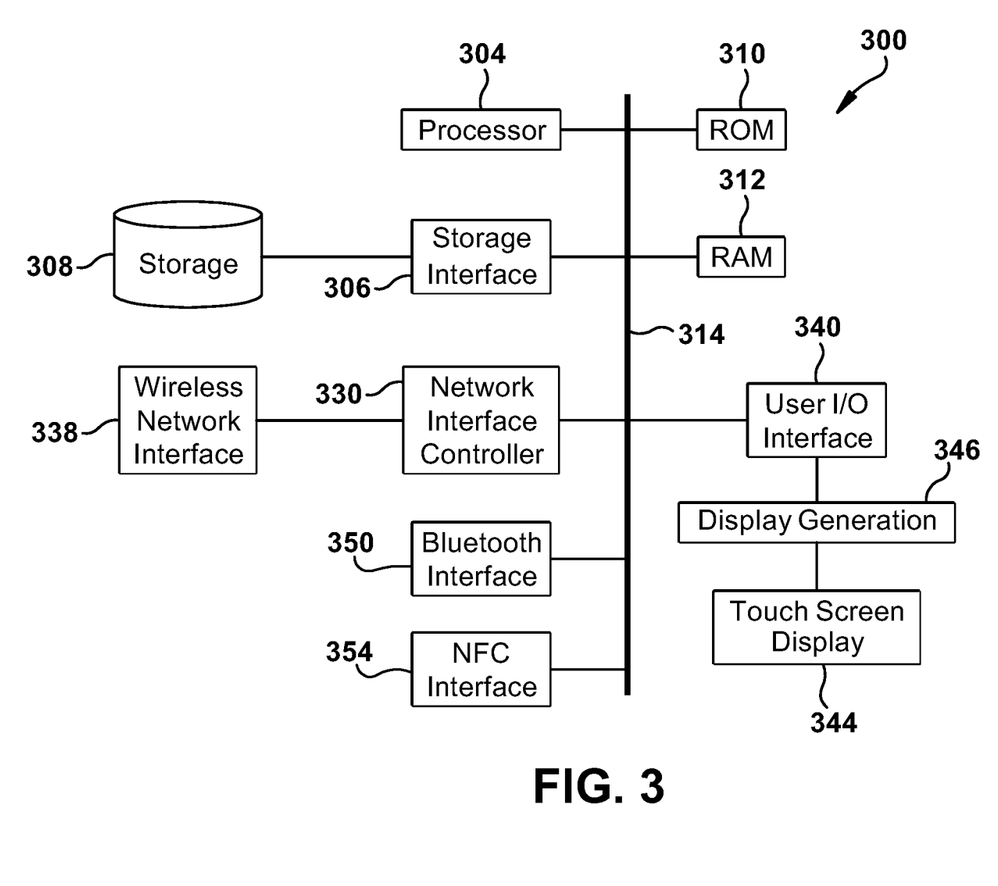
FIG. 3 is an example embodiment of a digital device system.

Turning now to FIG. 3, illustrated is an example of a digital device system 300 suitably comprising servers 124, 128 and 132 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide arear network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Figure 4:
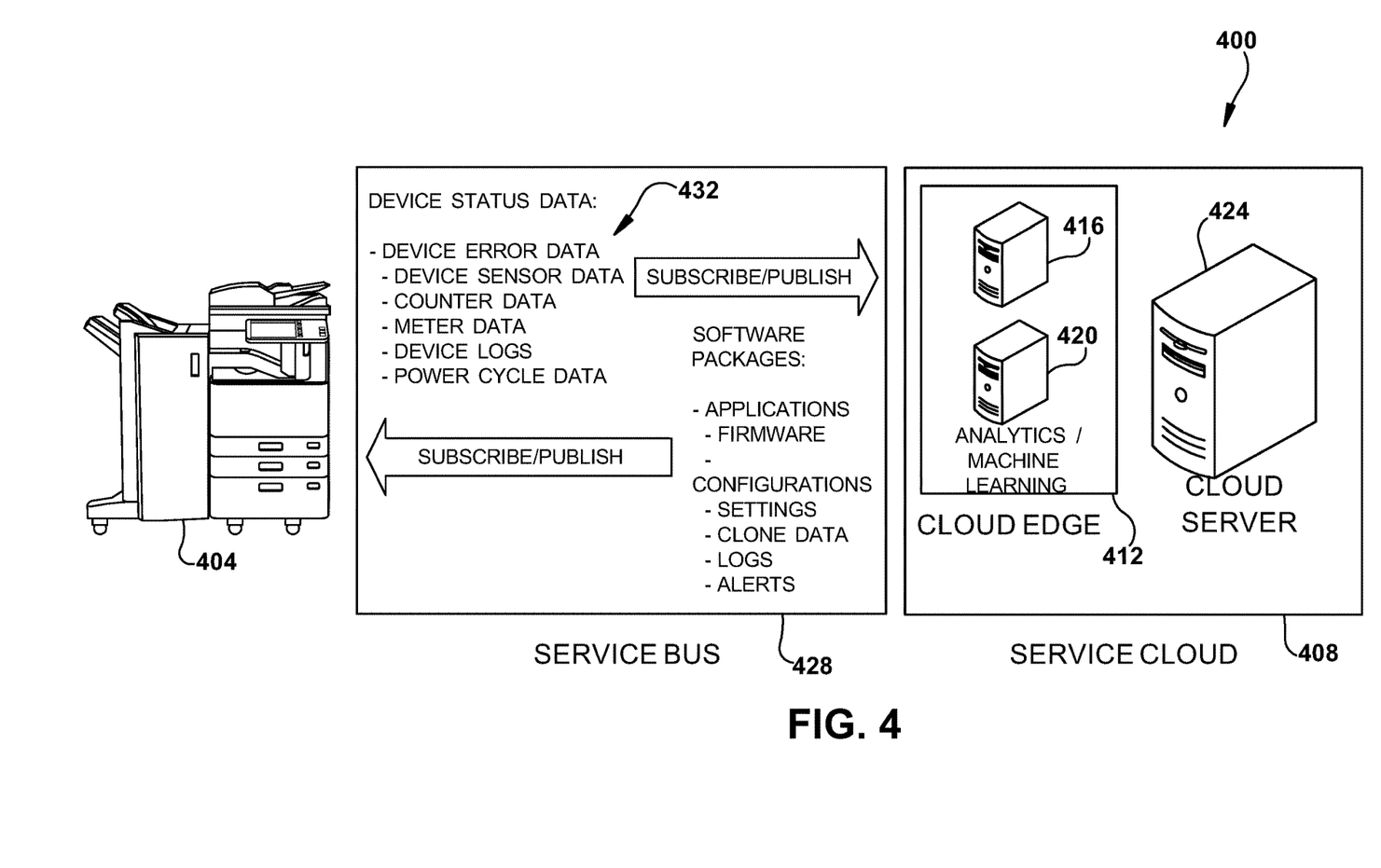
FIG. 4 is an example embodiment of a device monitoring system.

FIG. 4 illustrates an example embodiment of a device monitoring system 400 for one or more MFPs, such as MFP 404. Service cloud 408 includes cloud edge computing 412 comprised of one or more cloud edge servers, such as edge servers 416 and 420. Service cloud 408 also includes one or more cloud servers, such as cloud server 424. Cloud edge computing 412 suitably houses service bus 428 which has subscribe-publish messaging with MFP 404. Device state or status data 432 suitably includes device state data for MFP 404, including data such as device error data, device sensor data, counter data, meter data, device logs, power cycle data, and the like. Service bus 428 performs analytics, such as machine learning, on device status data which is accumulated over time. Servicing data resultant from such analytics is suitably communicated to cloud server 424 which determines and sends a software package to service bus 428 for deployment as a subscribe-publish message or messages between MFP 404 and service bus 428. A software package is any digitally encoded package, and may include applications, firmware, configurations, clone data to replicate MFP configurations, device logs or alerts. Service bus 428 provides for persistent data communication between cloud edge 412 and cloud server 424, even should one or more MFPs be out of communication with service bus 428. Service bus 428 also provides for efficient MFP device monitoring from many MFP devices while lessening cloud data traffic or burden on cloud server resources.

Figure 5:
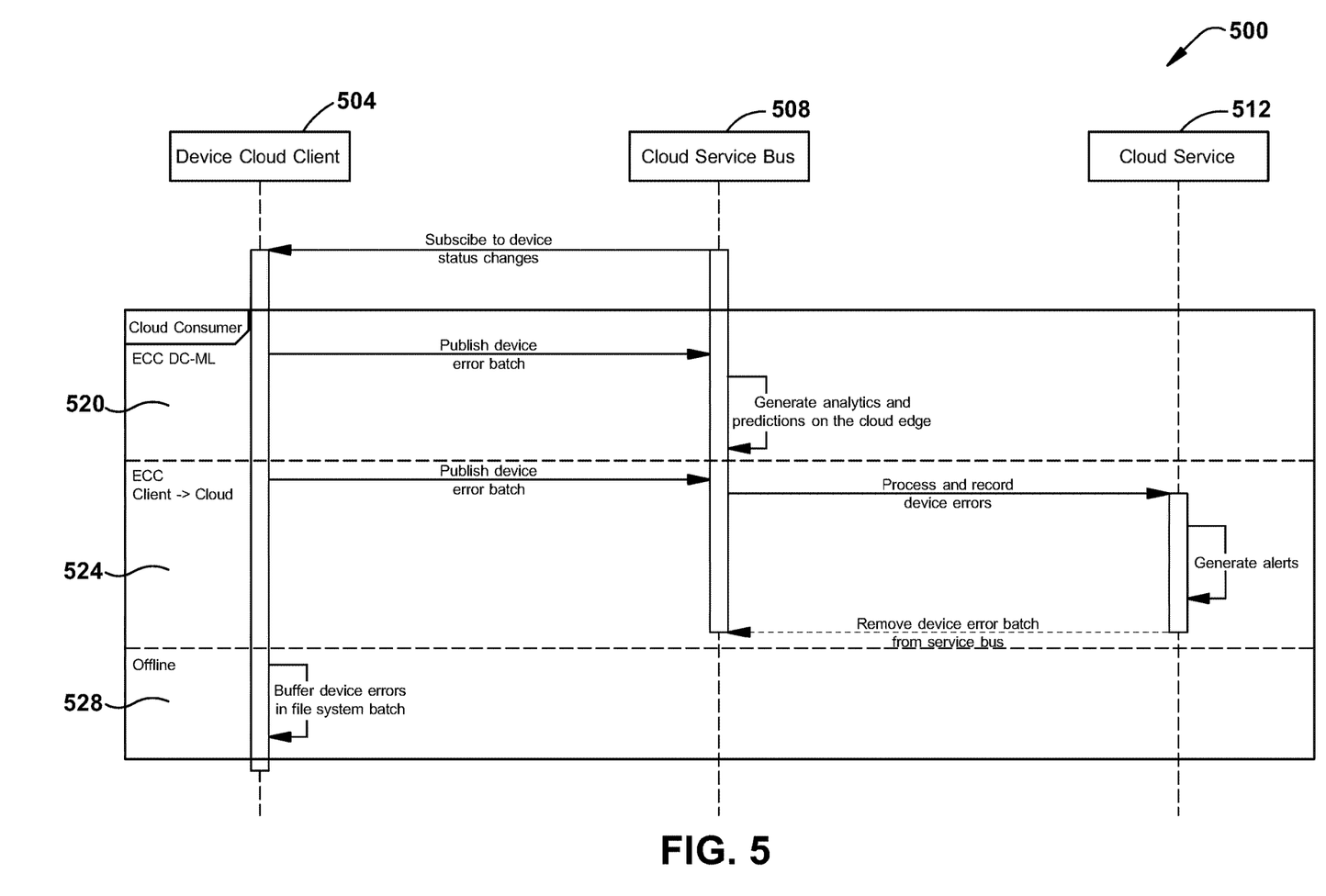
FIG. 5 is a flow diagram of an example embodiment of a publish-subscribe device state monitoring system.

FIG. 5 is a flow diagram 500 of an example embodiment of a device management system between device cloud client 504, cloud service bus 508 and cloud server 512 for receiving MFP state information. Service bus 508 subscribes to cloud client 504 for device status changes. Cloud client 504 publishes, in return device status changes and device errors to service bus 508. Device errors are reported at 520, suitably through an e-Bridge CloudConnect data server, suitably with machine learning capabilities. Such reporting is suitably batched and dispatched over one or more intervals. Device errors are suitably published via an e-Bridge CloudConnect client to cloud reporting at 524. When cloud client 504 is offline at 528, device errors or status changes are suitably batched for communication to service bus 508 when back online.

Figure 6:
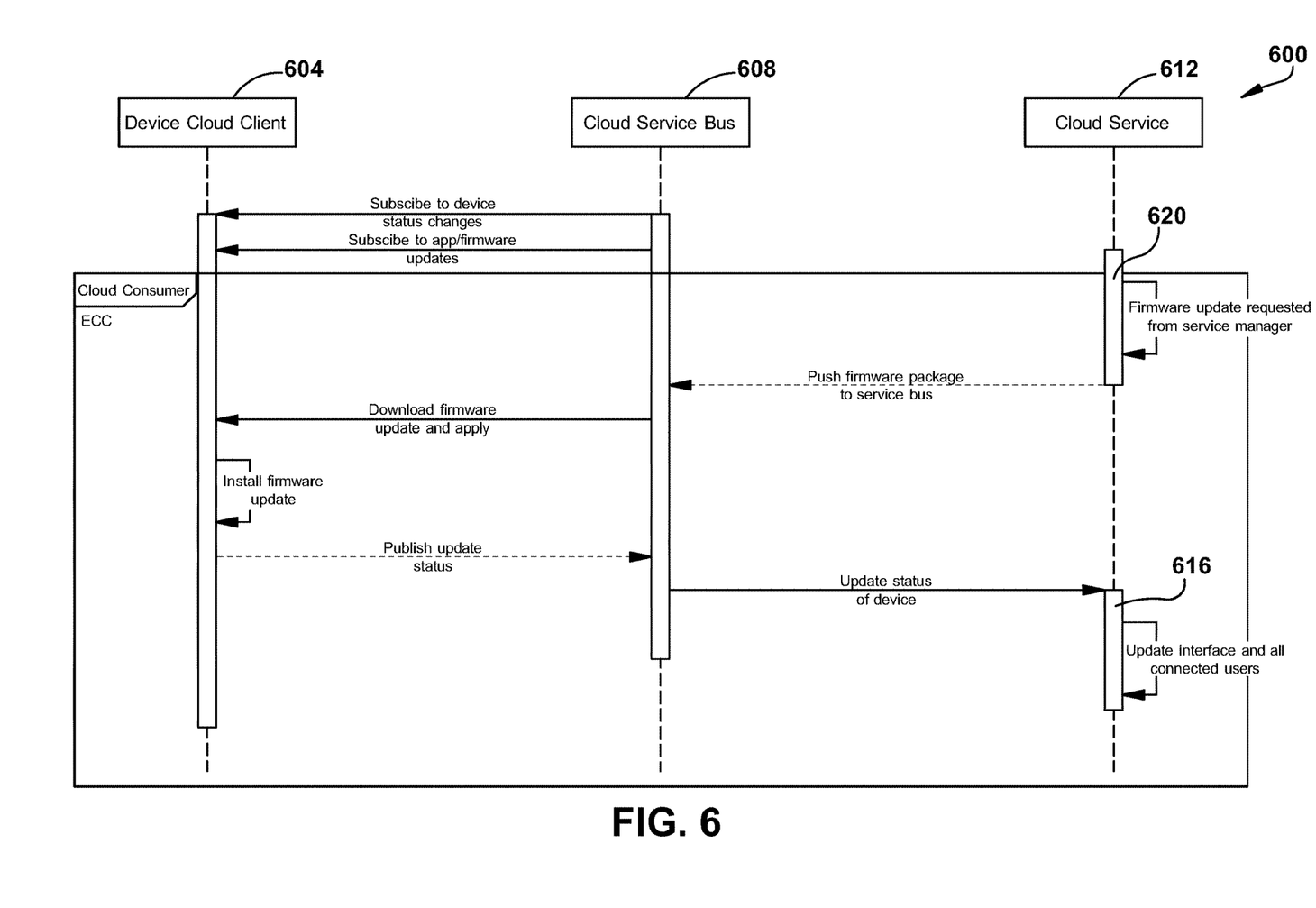
FIG. 6 is a flow diagram of another example embodiment of a publish-subscribe device monitoring system for software delivery.

FIG. 6 is a flow diagram 600 of an example embodiment of a device management system between device cloud client 604, cloud service bus 608 and cloud server 612 for installation of a software package, such as an application or firmware. Service bus 608 subscribes to cloud client 604 for device status changes, as well as for software updates. Service bus 608 provides updated status information regarding cloud client 604 to cloud device 612. In the example embodiment, a determination is made by cloud service 612 to update device interfaces based on received status information at 616. An associated firmware package is determined at 620, and this firmware is relayed to cloud client 604 via service bus 608. Cloud client 604 installs the firmware and provides a state update to cloud service bus 608.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor;
a memory; and
a network interface configured for data connection to each of a plurality of multifunction peripherals,
wherein the processor is configured to subscribe to a device status messaging service published by each of the multifunction peripherals,
wherein the processor is further configured to register a message queue of each multifunction peripheral as a client,
wherein the processor is further configured to periodically receive, pursuant to each subscription, published, batched device state data corresponding to a state of each multifunction peripheral into an associated message queue,
wherein the processor is further configured to store received state data in the memory,
wherein the processor is further configured to generate real-time servicing data corresponding to a device service prediction for one or more of the multifunction peripherals in accordance with stored state data,
wherein the processor is further configured to communicate the state data to an associated cloud server via the network interface,
wherein the processor is further configured to receive a software package from the cloud server,
wherein the processor is further configured to subscribe to a software messaging service published by some or all of the multifunction peripherals,
wherein the processor is further configured to subscribe to an update status messaging service with each multifunction peripheral with a software messaging service subscription,
wherein the processor is further configured to relay a received software package to multifunction peripherals with a software subscription for installation,
wherein the processor is further configured to receive update status data from each multifunction with a software subscription, and
wherein the processor is further configured to relay received update status data to the cloud server.

2. The system of claim 1 wherein the state data includes count data corresponding to a count of multifunction peripheral document processing operations.

3. The system of claim 2 wherein the state data includes error data associated with erroneous multifunction peripheral operation.

4. The system of claim 3 wherein the state data includes sensor output from integrated multifunction peripheral sensors.

5. The system of claim 4 wherein the processor is further configured to generate the servicing data in accordance with application analytics on the state data.

6. The system of claim 5 wherein analytics is comprised of machine learning.

7. The system of claim 1 wherein the software package is comprised of multifunction peripheral firmware.

8. The system of claim 1 wherein the software package is comprised of a multifunction peripheral application.

9. A method comprising:
subscribing to a device status messaging service published by each of a plurality of multifunction peripherals;
registering a message queue of each multifunction peripheral as a client;
periodically receiving, from each of the multifunction peripherals, published, batched state data corresponding to a state of each multifunction peripheral into an associated message queue via a network interface;
periodically reading each client message queue to receive state data corresponding to an updated state of each associated multifunction peripheral;
storing state data in a memory;
generating real-time servicing data corresponding to a device service prediction for one or more of the multifunction peripherals in accordance with stored state data;
communicating the state data to an associated cloud server via the network interface;
receiving a software package from the cloud server
subscribing to a software messaging service published by some or all of the multifunction peripherals; and
subscribing to an update status messaging service with each multifunction peripheral with a software messaging subscription;
relaying a received software package to one or more client multifunction peripherals with a software subscription for installation;
receiving update status data from each multifunction peripheral with a messaging service subscription after receipt of the software package; and
relaying received update status data to the cloud server.

10. The method of claim 9 wherein the state data includes count data corresponding to a count of multifunction peripheral document processing operations.

11. The method of claim 10 further comprising receiving the state data including error data associated with erroneous multifunction peripheral operation.

12. The method of claim 11 further comprising receiving the state data including sensor output from integrated multifunction peripheral sensors.

13. The method of claim 12 further comprising applying analytics on the state data to generate the servicing data.

14. The method of claim 13 further comprising applying machine learning to the state data to generate the servicing data.

15. The method of claim 9 further comprising relaying the software package comprised of multifunction peripheral firmware.

16. The method of claim 9 further comprising relaying the software package comprised of a multifunction peripheral application.

17. A service bus comprising:
a processor;
memory; and
a network interface,
wherein the processor is configured to subscribe to a device messaging service for device status changes published by each of a plurality of multifunction peripherals;
wherein the processor is further configured to subscribe to a software update messaging service published by all or some of the multifunction peripherals for communicating software updates;
wherein the processor is further configured to subscribe to a software update status messaging service with each multifunction peripheral with a software update messaging service subscription;
wherein the processor is further configured to receive batched device status data as it is published by each multifunction peripheral corresponding to its status via the device messaging service;
wherein the processor is further configured to generate real-time analytical data in accordance with device status data as it is received;
wherein the processor is further configured to receive a software package from the cloud service;
wherein the processor is further configured to communicate a received software package to multifunction peripherals with a software update messaging service subscription;
wherein the processor is further configured to receive software update status data from multifunction peripherals via the software update status messaging service subscription; and
wherein the processor is further configured to relay received software update status data to the cloud server.

18. The system of claim 17 wherein the service bus is comprised of a plurality of cloud edge computing devices.

19. The system of claim 17 wherein the software package includes one or more of applications, firmware or device settings.

* * * * *